United States Patent Office

2,758,931
Patented Aug. 14, 1956

---

2,758,931

ANTIOXIDANT COMPOSITION

Lloyd A. Hall, Chicago, Ill., assignor to The Griffith Laboratories, Inc., a corporation of Illinois No Drawing. Application November 23, 1953, Serial No. 393,949

10 Claims. (Cl. 99—163)

This invention relates to an antioxidant composition containing fatty monoglyceride citrate, propyl gallate, and glycerin.

As disclosed in my copending application Serial No. 393,950, filed November 23, 1953, citric acid may be rendered fat soluble without in any way destroying the value of the citric acid as a synergist or as a metal sequestering material by reacting it under proper conditions with fatty monoglycerides. This new compound may then be combined with propyl gallate to serve as an excellent fat soluble and water miscible antioxidant which can be readily introduced to the fat.

I have discovered that the stability of the fatty monoglyceride citrate-propyl gallate mix disclosed in my copending application Serial No. 393,950, filed November 23, 1953, is materially improved by the addition of a minor proportion of glycerin. When small amounts of glycerin are added to the fatty monoglyceride citrate-propyl gallate mix, the resulting antioxidant composition is characterized by much improved clarity and resistance to sedimentation.

By a minor proportion of glycerin, I mean amounts of from about 0.5% up to about 2.5% of the weight of the combined antioxidant composition in an edible oil, with the amount of fatty monoglyceride citrate-propyl gallate mix constituting from about 17 to 42.5% of the weight of the combined antioxidant composition in an edible oil.

The fatty monoglycerides are, of course, well known as emulsifying or dispersing agents. However, as disclosed in my copending application Serial No. 393,950, filed November 23, 1953, they form a new reaction product with citric acid, fatty monoglyceride citrate. The existence of this new compound has been shown definitely by X-ray studies. Microanalysis of the material shows complete absence of citric acid.

The term "fatty monoglyceride" has been employed to cover monoglycerides of the higher fatty acids, particularly those with ten or more carbon atoms. Preferably, of course, the glycerides are of fatty acids of the order of eighteen carbon atoms. The fatty acids need not be saturated.

The preferred monoglyceride actually employed has the following characteristics:

*Average chemical and physical data*

Cottonseed monoglyceride:
    Monoester content_____ 90.0% (minimum).
    Saponification value_____ 150–160.
    Iodine value_____ 80–90.
    Glycerol content_____ 1.0% (maximum).
    F. F. A. (as oleic)_____ 1.5% (maximum).
    Specific gravity_____ 0.96 @ 60° C.
    Melting point_____ 45–50° C.

Other monoglycerides that may be used have the following characteristics:

Lard monoglyceride:
    Monoester content_____ 90.0% (minimum).
    Saponification value_____ 160–170.
    Iodine value_____ 45–55.
    Glycerol content_____ 1.0% (maximum).
    F. F. A. (as oleic)_____ 1.5% (maximum).
    Specific gravity_____ 0.96 @ 60° C.
    Melting point_____ 50–60° C.

Hydrogenated lard monoglyceride:
    Monoester content_____ 90.0% (minimum).
    Saponification value_____ 160–170.
    Iodine value_____ 3 (maximum).
    Glycerol content_____ 1.0% (maximum).
    F. F. A. (as stearic)_____ 1.5% (maximum).
    Specific gravity_____ 0.96 @ 75° C.
    Melting point_____ 70° C., 158° F. (approx.).

As an example of making the glycerin fortified fatty monoglyceride citrate-propyl gallate antioxidant composition, anhydrous citric acid was added to cottonseed monoglyceride previously heated to 245–260° F. The mix was agitated moderately for about 3 hours until substantially complete reaction occurred. During this period the temperature was maintained at from 245–260° F. Propyl gallate was then added to the resulting fatty monoglyceride citrate solution at 245–260° F. The heat was cut off and the temperature decreased to 210–225° F. and the mix stirred for 45 minutes at this temperature range and until the propyl gallate was completely dissolved. Glycerin was then added to this mixture at 195–210° F. and agitated for 5 minutes, by which time the glycerin was completely dissolved.

A preferred formulation used in this procedure is as follows:

| | Grams |
|---|---|
| Cottonseed monoglyceride | 28.0 |
| Anhydrous citric acid | 5.0 |
| Propyl gallate | 6.5 |
| Glycerin | 0.5 |
| Total | 40.0 |

As an example of making the glycerin fortified fatty monoglyceride citrate-propyl gallate antioxidant dissolved in an edible oil anhydrous citric acid was added to cottonseed monoglyceride previously heated to 245–260° F., and the mix agitated moderately for 3 hours. Propyl gallate was added to the resulting reaction product at 245–260° F., without application of heat, the fatty monoglyceride citrate-propyl gallate mix being agitated moderately for 45 minutes at a temperature of 210–225° F. Glycerin was added to this mix at 195–210° F., and agitated 10–15 minutes. Corn oil was added at 195–210° F. and the resulting mixture agitated 10–15 minutes until the corn oil and the mixture formed a clear solution.

A preferred formulation used in this procedure is:

| | Per cent |
|---|---|
| Cottonseed monoglyceride | 28.0 |
| Anhydrous citric acid | 5.0 |
| Propyl gallate | 6.5 |
| Glycerin | 0.5 |
| Corn oil | 60.0 |
| Total | 100.0 |

The product of this formulation had a jelling point of 44–45° F., a turbidity point of 56–58° F., and a clearing point of 65° F. It took several hours for the product to become turbid at 56–58° F.

The resultant anti-oxidant composition-edible oil mixture is more brilliant where the glycerin is added to the fatty monoglyceride citrate-propyl gallate mix rather than after the edible oil has been added. Thus, it is preferred to add the glycerin to the fatty monoglyceride citrate-propyl gallate mix.

The above-mentioned preferred formulation was mixed with a commercial lard to test its antioxidant properties. Approximately 8 oz. of the formulation was added to 1000 lb. of lard. A sample of the lard without the antioxidant became rancid in 4.5 hours while the fortified lard did not become rancid until 37.0 hours had elapsed, the rancidity being determined by the standard active oxygen method.

Fatty monoglyceride and citric acid may be reacted at a temperature range of from about 220–300° F. Prolonged heating of the mix above 300–310° F. is destructive to the fatty monoglyceride citrate and below 220° F. the product formed is unstable. An alternative to the preferred conditions of 245–260° F. with 3 hours agitation set forth above is a temperature of 265–275° F. with moderate agitation for 1½ to 2 hours.

Prolonged agitation of the fatty monoglyceride-propyl gallate mix produces an opaque solution which will result in sedimentation. To prevent this opaqueness, agitation should be limited to not more than about 30 minutes at 260–265° F., or to not more than about 55 minutes at 230–240° F.

Other formulations have been prepared using the procedures outlined above for incorporating glycerin and employing the following proportions:

|  | Percent | Percent | Percent | Percent |
|---|---|---|---|---|
| Cottonseed Monoglyceride | 22.0 | 27.0 | 30.0 | 30.0 |
| Citric Acid | 5.0 | 5.0 | 5.0 | 5.0 |
| Propyl Gallate | 6.5 | 6.5 | 6.5 | 3.5 |
| Glycerin | 0.5 | 0.5 | 1.5 | 2.5 |
| Corn Oil | 66.0 | 61.0 | 57.0 | 56.0 |
| Total | 100.0 | 100.0 | 100.0 | 100.0 |

Crystalline citric acid (the monohydrate $C_6H_8O_7 \cdot H_2O$ containing 8.58% $H_2O$ of crystallization) may be employed in place of anhydrous citric acid.

In each of the above formulations, the degree of clarity and resistance to sedimentation were markedly improved over similar formulations which did not contain glycerin. The optimum results were obtained with formulations using 0.5% glycerin.

Similar formulations were prepared using rice oil instead of corn oil and proceeding in the same way. Other vegetable or animal oils may be employed. Selection of an animal oil as against a vegetable oil normally will be determined by the product in which the material is to be employed.

As an example of using rice oil, anhydrous citric acid was added to cottonseed monoglyceride previously heated to 245–260° F. with moderate agitation for 3 hours. The heat was cut off and propyl gallate added, followed by agitation for 45 minutes at a temperature of 210–225° F. Glycerine was added at 195–210° F. and the mix agitated for 5 minutes. Rice oil was added at 195–210° F. and agitated 10–15 minutes.

A preferred formulation employing rice oil is as follows:

| | Per cent |
|---|---|
| Cottonseed monoglyceride | 28.0 |
| Anhydrous citric acid | 5.0 |
| Propyl gallate | 6.5 |
| Glycerin | 0.5 |
| Rice oil | 60.0 |
| Total | 100.0 |

As disclosed in my copending application Serial No. 393,950, filed November 23, 1953, a combination of antioxidants may be employed, such as propyl gallate and "BHA" (butylated hydroxyanisole), in the preparation of an edible oil-antioxidant composition that has excellent resistance to oxidation, thereby avoiding rancidity.

The procedures for preparaing such edible oil mixtures, fortified by glycerin, are substantially the same as those outlined above for use with propyl gallate alone. Instead of adding the edible oil alone at the end of the preparation, it is preferred to add a "BHA" concentrate to the fatty monoglyceride citrate-propyl gallate-glycerin mix. The "BHA" concentrate is prepared by dissolving "BHA" in an edible oil such as corn oil at 120–130° F., followed by stirring for 25 to 30 minutes. This concentrate is then added to the fatty monoglyceride citrate-propyl gallate-glycerin mix at 195–210° F., followed by moderate agitation for 10–15 minutes, by which time complete solution occurs.

As an example of preparing the combined antioxidant composition fortified with glycerin, anhydrous citric acid was added to cottonseed monoglyceride previously heated to 245–260° and the mix agitated moderately for three hours until substantially complete reaction occurred. Propyl gallate was sifted through a 10 mesh sieve directly into the resulting reaction product at 245–260° F., without application of heat. The fatty monoglyceride citrate propyl gallate mix was moderately stirred for 45 minutes, the temperature being maintained at 210–225° F. Glycerin was added to this mixture at 195–210° F. and agitated for 5 minutes.

"BHA" concentrate, prepared by dissolving "BHA" in corn oil at 120–130° F. followed by stirring for 25 to 30 minutes after which the concentrate temperature was 100–115° F., was then added to the fatty monoglyceride citrate-propyl gallate-glycerin mix at 195–210° F. and agitated for 10 to 15 minutes.

A preferred formulation used in this procedure is as follows:

| | Per cent |
|---|---|
| Fatty monoglyceride | 25.0 |
| Anhydrous citric acid | 5.0 |
| Propyl gallate | 5.0 |
| Glycerin | 0.5 |
| "BHA" concentrate | 64.5 |
| | 100.0 |

| "BHA" concentrate: | |
|---|---|
| "BHA" | 11.0 |
| Corn oil | 53.5 |
| | 64.5 |

The resultant antioxidant produced had a jelling point of 40–42° F., a turbidity point of 54–57° F., and a clearing point of 58–61° F. It took several hours for the product to become turbid at 54–57° F.

In another example of preparing the glycerine fortified fatty monoglyceride citrate with combined antioxidants, crystalline citric acid was added to cottonseed monoglyceride previously heated to 265–275° F., and the mix agitated moderately for 1½ to 2 hours, when substantially complete reaction occurred.

Propyl gallate was added at 255–265° F. with vigorous agitation for 5 to 10 minutes, without application of heat. The agitation was reduced to a moderate stir, and the temperature allowed to drop gradually to 200–215° F., taking approximately 35–45 minutes.

"BHA" concentrate at a temperature of 100–115° F. was added to the fatty monoglyceride citrate-propyl gallate mix at 210–220° F., and the solution agitated for 5 to 10 minutes until the "BHA" concentrate was completely dissolved. Glycerin was slowly added to the solution at 130–145° F., the addition requiring 3 to 5 minutes after which the solution was moderately agitated for 15 minutes.

A preferred formulation used in the modified procedure is as follows:

| | Per cent |
|---|---|
| Fatty monoglyceride | 26.0 |
| Crystalline citric acid | 5.0 |
| Propyl gallate | 5.0 |
| "BHA" concentrate | 62.5 |
| Glycerin | 1.5 |
| | 100.0 |

| "BHA" concentrate: | |
|---|---|
| "BHA" | 11.0 |
| Corn oil | 51.5 |
| | 62.5 |

As before, the glycerin-fortified product resulting from addition of glycerin to the fatty monoglyceride citrate-propyl gallate mix at 195–210° F. is more brilliant than the product where glycerin is added at the end of the process. Optimum results are obtained, therefore, by adding the glycerin to the fatty monoglyceride citrate-propyl gallate mix.

Other formulations have been prepared using the same procedures for incorporating glycerin as outlined above and employing the following proportions:

|  | Percent | Percent | Percent |
|---|---|---|---|
| Cottonseed Monoglyceride | 18.0 | 26.0 | 26.0 |
| Citric Acid | 5.0 | 5.0 | 5.0 |
| Propyl Gallate | 5.0 | 6.5 | 5.0 |
| "BHA" Concentrate | 69.5 | 60.5 | 61.5 |
| Glycerin | 2.5 | 2.0 | 2.5 |
| Total | 100.0 | 100.0 | 100.0 |
| "BHA" Concentrate: | | | |
| "BHA" | 11.0 | 12.0 | 11.0 |
| Corn Oil | 58.5 | 48.5 | 50.5 |
|  | 69.5 | 60.5 | 61.5 |

Optimum results are obtained in the use of combined antioxidants when fortified by 1.5% glycerin.

Glycerin-fortified compositions may be prepared using other oils like rice and olive oils in place of corn oil. As an example of using rice oil, anhydrous citric acid was added to cottonseed monoglyceride previously heated to 245–255° F., and the mix agitated moderately for 3 hours. Propyl gallate was added to the resulting reaction product, followed by moderate agitation for 45 minutes, the temperature being maintained at 210–225° F. Glycerin was added to the fatty monoglyceride citrate-propyl gallate mix at 195–210° F. and agitated 5 minutes.

"BHA" concentrate, prepared by dissolving "BHA" in rice oil, was added to the mix at 195–210° F. and agitated 10–15 minutes. The resultant product was clear, with a yellowish green tinge, no signs of sedimentation appearing upon standing.

A preferred formulation using this procedure is as follows:

| | Per cent |
|---|---|
| Fatty monoglyceride | 25.0 |
| Anhydrous citric acid | 5.0 |
| Propyl gallate | 5.0 |
| Glycerin | 0.5 |
| "BHA" concentrate | 64.5 |
| Total | 100.0 |
| "BHA" concentrate: | |
| "BHA" | 11.0 |
| Rice oil | 53.5 |
| | 64.5 |

The above-mentioned preferred formulation was mixed with a commercial lard to test its antioxidant properties. Approximately 8 oz. of the formulation was added to 1000 lb. of lard. A sample of the lard without the antioxidant became rancid in 9.0 hours while the fortified lard did not become rancid until 76.0 hours had elapsed, the rancidity being determined by the standard active oxygen method.

Glycerin may be used to fortify the fatty monoglyceride citrate-propyl gallate mixes disclosed in my copending application, Serial No. 393,950, filed November 23, 1953, wherein the following proportions of mixes were specified:

|  | Percent | Percent | Percent |
|---|---|---|---|
| Cottonseed Monoglyceride | 10.000 | 15.000 | 20.000 |
| Citric Acid | 3.735 | 3.735 | 3.735 |
| Propyl Gallate | 3.335 | 3.335 | 3.335 |
|  | 17.070 | 22.070 | 27.070 |
| Cottonseed Monoglyceride | 18.0 | 15.0 | 27.0 |
| Citric Acid | 5.0 | 5.0 | 9.0 |
| Propyl Gallate | 3.34 | 3.34 | 6.5 |
|  | 26.34 | 23.34 | 42.5 |

The 17.07% formulation appears to be the minimum concentration of antioxidant, sedimentation appearing in the edible oil when lower concentrations of antioxidant are used. Antioxidant concentrations in excess of 42.5% cause the fortified edible oil to become cloudy upon standing for several days.

The foregoing detailed description has been given for clearness of understanding only and no unnecessary limitations should be understood therefrom as modifications will be obvious to those skilled in the art.

I claim:

1. An antioxidant composition comprising a solution in a fatty monoglyceride of effective amounts of the antioxidants fatty monoglyceride citrate and propyl gallate, and added glycerin in an amount sufficient to improve the clarity and resistance to sedimentation of the solution.

2. An antioxidant composition comprising a solution in an edible oil of effective amounts of the antioxidants fatty monoglyceride citrate and propyl gallate, and added glycerin in an amount sufficient to improve the clarity and resistance to sedimentation of the solution.

3. An antioxidant composition comprising a solution in an edible oil of effective amounts of the antioxidants fatty monoglyceride citrate, propyl gallate and butylated hydroxyanisole, and added glycerin in an amount sufficient to improve the clarity and resistance to sedimentation of the solution.

4. An antioxidant composition comprising a solution in an edible oil of effective amounts of the antioxidants fatty monoglyceride citrate and propyl gallate, and added glycerin in an amount sufficient to improve the clarity and resistance to sedimentation of the solution but not more than 2.5% by weight of the solution.

5. The antioxidant composition of claim 4 to which an effective amount of butylated hydroxyanisole is added.

6. The method which comprises mixing effective amounts of the antioxidants propyl gallate and fatty monoglyceride citrate at a temperature of from about 230 to 265° F., agitating the resulting mix until the propyl gallate is substantially completely dissolved, adding glycerin in an amount sufficient to improve the clarity and resistance to sedimentation of the fatty monoglyceride propyl gallate mix, and agitating the mixing until the glycerin is substantially completely dissolved.

7. The method which comprises mixing effective amounts of the antioxidants propyl gallate and fatty monoglyceride citrate at a temperature of from about 230 to 265° F., agitating the resulting mixture until the propyl gallate is substantially dissolved, adding glycerin to the mixture, agitating until the glycerin is substantially dissolved, adding an edible oil to the mixture and agitating the mixture until a substantially clear solution occurs, the combined weight of propyl gallate and fatty monoglyceride citrate in the clear solution being about 17 to 42½% by weight and the glycerin being about 0.5% to 2.5% by weight.

8. The composition of claim 7 wherein butylated hydroxyanisole is added to the mixture.

9. An antioxidant composition comprising a solution in an edible oil of 17–42½% by weight of the composition of fatty monoglyceride citrate-propyl gallate mixture, and from about 0.5% to about 2.5% by weight of the composition of glycerin.

10. The composition of claim 9 wherein the edible oil contains a minor proportion of butylated hydroxyanisole.

References Cited in the file of this patent

UNITED STATES PATENTS

| 2,523,792 | Vahlteich et al. | Sept. 26, 1950 |
| 2,677,616 | Hall | May 4, 1954 |

OTHER REFERENCES

Kraybill et al.: Studies on Antioxidants, Bull. 4, (1949), American Meat Int., Chicago, Ill., pages 1–6.